US012587941B2

(12) United States Patent
Guo et al.

(10) Patent No.: US 12,587,941 B2
(45) Date of Patent: Mar. 24, 2026

(54) ROUTING DECISION METHOD AND SYSTEM BASED ON TRAFFIC PREDICTION

(71) Applicant: Nanjing University Of Posts And Telecommunications, Jiangsu (CN)

(72) Inventors: Yongan Guo, Jiangsu (CN); Dequan Yu, Jiangsu (CN); Hao She, Jiangsu (CN); Qijie Qian, Jiangsu (CN)

(73) Assignee: Nanjing University Of Posts And Telecommunications, Jiangsu (CN)

( * ) Notice: Subject to any disclaimer, the term of this patent is extended or adjusted under 35 U.S.C. 154(b) by 0 days.

(21) Appl. No.: 18/874,086

(22) PCT Filed: Jun. 7, 2023

(86) PCT No.: PCT/CN2023/098738
§ 371 (c)(1),
(2) Date: Dec. 12, 2024

(87) PCT Pub. No.: WO2023/241423
PCT Pub. Date: Dec. 21, 2023

(65) Prior Publication Data
US 2025/0374157 A1 Dec. 4, 2025

(30) Foreign Application Priority Data

Jun. 13, 2022 (CN) .......................... 202210661593.0

(51) Int. Cl.
*H04W 40/02* (2009.01)

(52) U.S. Cl.
CPC ................................... *H04W 40/02* (2013.01)

(58) Field of Classification Search
CPC ...... G06N 20/00; G06N 10/00; H04L 45/302; H04L 47/2441; H04L 45/08; H04L 45/14; H04L 45/306; H04W 40/02
See application file for complete search history.

(56) References Cited

U.S. PATENT DOCUMENTS 9,692,694 B2 * 6/2017 Wang ...................... H04L 45/52
10,924,393 B2 * 2/2021 Vasseur ................. H04L 47/724
(Continued)

FOREIGN PATENT DOCUMENTS

CN 109922004 A * 6/2019
CN 112202672 1/2021
(Continued)

OTHER PUBLICATIONS

Zheng-Zhi Zhang, "Research on SDN Based Multi Index Load Balancing Strategy for Flow Classification", Modern Computer, Feb. 25, 2020, with English abstract, pp. 1-6.
(Continued)

*Primary Examiner* — Mong-Thuy T Tran
(74) *Attorney, Agent, or Firm* — JC ONE WORLD

(57) ABSTRACT

Disclosed are a routing decision method and system based on traffic prediction. The method is used for obtaining each data link to be analyzed between a starting point and an ending point of a direct connection or an indirect connection for forwarding data packets to be forwarded in a target network area, and each node respectively included in each data link to be analyzed; when the target network area receives the data packets to be forwarded, training and obtaining a routing selection model corresponding to said packets for each data link to be analyzed for the direct connection or the indirect connection between the starting point and the ending point in the target network area, respectively; and applying the routing selection model to obtain an optimal forwarding path corresponding to said data packets, and forwarding said data packets.

6 Claims, 4 Drawing Sheets

(56) References Cited

U.S. PATENT DOCUMENTS

| | | | | |
|---|---|---|---|---|
| 11,233,704 | B2* | 1/2022 | Ganapathi ............. | H04L 43/062 |
| 2017/0126475 | A1 | 5/2017 | Mahkonen et al. | |
| 2022/0353195 | A1* | 11/2022 | Wei ....................... | H04L 41/122 |
| 2023/0140115 | A1* | 5/2023 | Vasseur ................. | H04L 45/123 |
| | | | | 709/238 |
| 2023/0171186 | A1* | 6/2023 | Yelahanka Raghuprasad ............. | |
| | | | | H04L 45/46 |
| | | | | 370/254 |

FOREIGN PATENT DOCUMENTS

| | | |
|---|---|---|
| CN | 113114573 | 7/2021 |
| CN | 113114582 | 7/2021 |
| CN | 114760669 | 7/2022 |

OTHER PUBLICATIONS

"International Search Report (Form PCT/ISA/210) of PCT/CN2023/098738", mailed on Aug. 24, 2023, with English translation thereof, pp. 1-5.
"Written Opinion of the International Searching Authority (Form PCT/ISA/237) of PCT/CN2023/098738", mailed on Aug. 24, 2023, pp. 1-5.

* cited by examiner

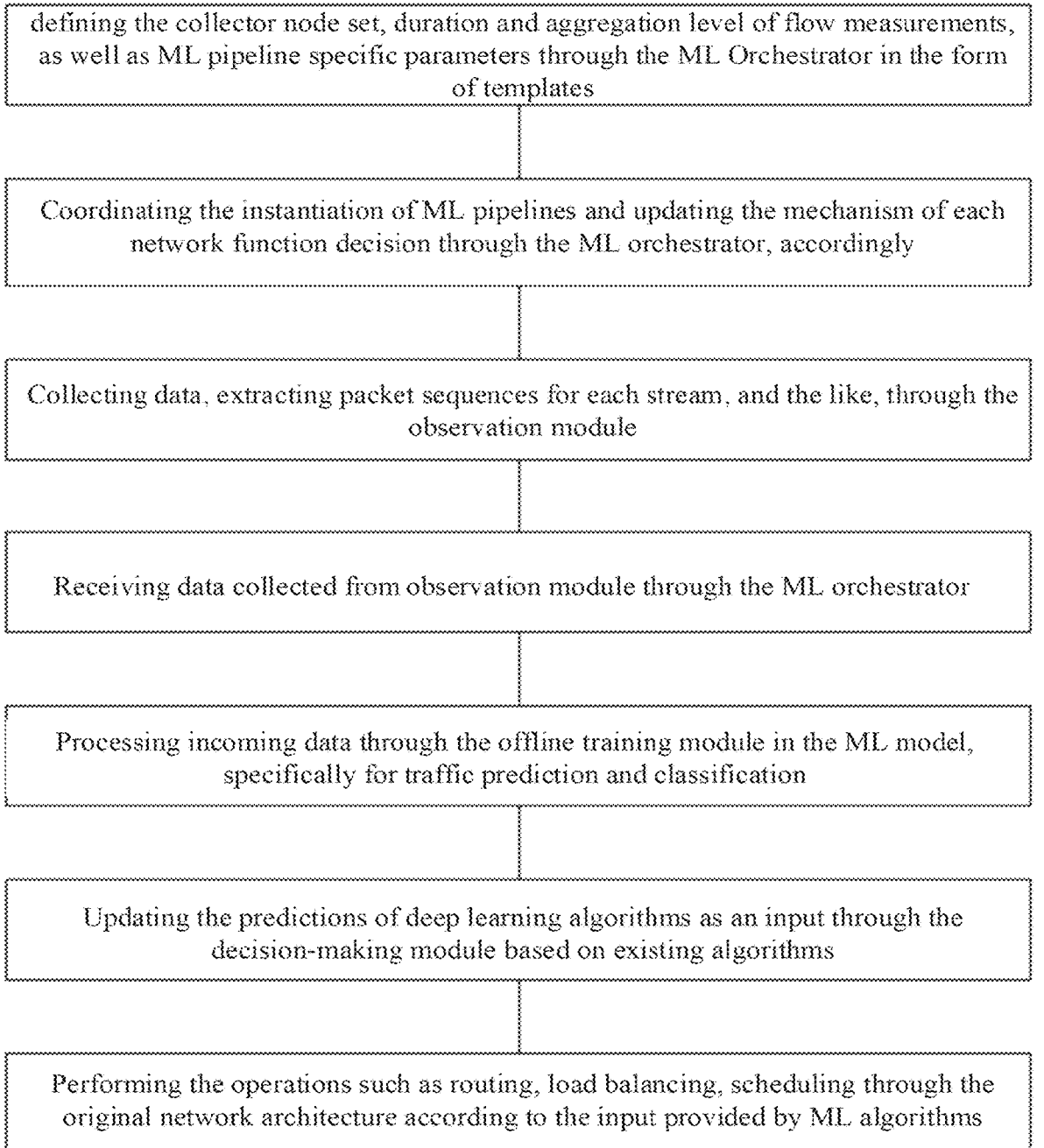

defining the collector node set, duration and aggregation level of flow measurements, as well as ML pipeline specific parameters through the ML Orchestrator in the form of templates Coordinating the instantiation of ML pipelines and updating the mechanism of each network function decision through the ML orchestrator, accordingly Collecting data, extracting packet sequences for each stream, and the like, through the observation module Receiving data collected from observation module through the ML orchestrator Processing incoming data through the offline training module in the ML model, specifically for traffic prediction and classification Updating the predictions of deep learning algorithms as an input through the decision-making module based on existing algorithms Performing the operations such as routing, load balancing, scheduling through the original network architecture according to the input provided by ML algorithms

FIG. 4

ROUTING DECISION METHOD AND SYSTEM BASED ON TRAFFIC PREDICTION

CROSS-REFERENCE TO RELATED APPLICATION

This application is a 371 of international application of PCT application serial no. PCT/CN2023/098738, filed on Jun. 7, 2023, which claims the priority benefit of China application no. 202210661593.0, filed on Jun. 13, 2022. The entirety of each of the above mentioned patent applications is hereby incorporated by reference herein and made a part of this specification.

TECHNICAL FIELD

The present disclosure relates to the technical field of routing decision technology, and in particular to a routing decision method and system based on traffic prediction.

BACKGROUND

5G/6G are not only complex and difficult to be managed, but also required to satisfy a variety of stringent performance requirements and rapidly adapt to changes in traffic and network status. The novel powerful tools are supported by advances in machine learning and parallel computing, and these tools may have the potential to address these complex challenges.

The machine learning models are embedded into the design of specific algorithms by the previous work, which focuses on network functions, including: mobility management, resource management and orchestration, as well as service provision; detection and channel estimation in massive MIMO systems; routing; and resource extension of virtual network functions (VNF).

The main disadvantages are precisely that they are mechanism specific, that is, each network control mechanism requires specialized machine learning methods to be built and cannot be easily reused. In contrast, machine learning is used for accurate traffic predictions which can be directly used as the inputs for improving algorithms and decision-making module. Previous work mainly focused on traffic analysis to optimize specific network operations, such as routing or VNF resource expansion. At the same time, the novel method relies on traffic analysis to improve the performance of general network control mechanisms.

SUMMARY

The objectives of the present disclosure are to provide a routing decision method and system based on traffic prediction to solve the problems in prior art.

In order to achieve the above objectives, the following technical solutions are provided in the present disclosure.

Provided is a routing decision method based on traffic prediction, the method is used for obtaining each data link to be analyzed between a starting point and an ending point of a direct connection or an indirect connection for forwarding data packets to be forwarded in a target network area, and each node respectively included in each data link to be analyzed; in a case where the target network area receives the data packets to be forwarded, based on positions of the data packets to be sent in the target network area, in view of the each data link to be analyzed for the direct connection or the indirect connection between the starting point and the ending point in the target network area, respectively, a routing selection model corresponding to the data packets to be forwarded on the each data link to be analyzed are trained and obtained through following Step A to Step D. then by applying the routing selection model, an optimal forwarding path corresponding to the data packets is obtained through following Step E, and the data packets to be forwarded are forwarded according to the optimal forwarding path.

In Step A. preset data types respectively corresponding to each of forwarded data packets on the data link to be analyzed within one historical time period in a direction from a current time instant to a historical time instant direction are collected and obtained. In view of the each forwarded data packet, the each data link to be analyzed that the forwarded data packets pass through in the target network area, as well as each node included in the each data link to be analyzed are obtained, then, a global view corresponding to the forwarded data packets is obtained, that is, global views corresponding to the each forwarded data packet are obtained respectively, and then Step B is entered.

In Step B, in view of the each global view, a feature extraction module that is configured to extract features from the global views and further obtain link classification features corresponding to the global views is constructed, and then Step C is entered.

In Step C, preset data types corresponding to the data packets to be forwarded on the data links to be analyzed are collected and obtained, further global views corresponding to the data packets to be forwarded are obtained, and link classification features corresponding to the data packets to be forwarded are obtained by utilizing the feature extraction module, that is, global views corresponding to the data packets to be forwarded and the forwarded data packets are obtained, respectively.

Further, a classification prediction module that is configured to perform a feature conversion on the data packets to be forwarded and obtain a classification feature matrix for the each global view is constructed based on the each preset data type corresponding to the data packets to be forwarded as well as the each link classification feature corresponding to the data packets to be forwarded, and then Step D is entered.

In Step D. a routing selection model to be trained is trained for the data link to be analyzed, on a basis of the classification feature matrix obtained by the classification prediction module, by taking forwarded data types corresponding to the each forwarded data packet on the data link to be analyzed as an input, by taking a complete forwarding path in the global view as an output, by taking link classification features corresponding to the forwarded data packets on the data link to be analyzed as training samples, to obtain a routing selection model that is configured to select the optimal forwarding path; and then Step E is entered.

In Step E, the routing selection module is applied, for the data packets to be forwarded, on a basis of the link classification features corresponding to the data packets to be forwarded on the each data link to be analyzed, by taking the each preset data type corresponding to the data packets to be forwarded as an input, to determine the optimal forwarding path of the data packets to be forwarded, and the forwarding of the data packets to be forwarded is completed.

Further, in Step A, in view of the each forwarded data packets, the each global view corresponding to the for-warded data packets is obtained respectively, the global view includes the each data link to be analyzed that forwards the forwarded data packets and the each node contained in the each data link to be analyzed.

A global view G corresponding to the forwarded data packets respectively is characterized through an adjacency matrix, according to a following formula, $$G(V, E, \{f^v(u)\}, \{f^e(u, v)\});$$

where V denotes a set of the nodes contained in the data link to be analyzed, E denotes a set of the data links to be analyzed corresponding to the forwarded data packets, u and v denote vertices of the global view respectively, that is, nodes of the data link to be analyzed, e denotes the data link to be analyzed, $f^v(u)$ denotes node features, $f^e(u, v)$ denotes features of the data link e to be analyzed.

Node features $f^e(u, v)$ of the data link e to be analyzed are obtained according to a following formula:

$$f^e(u, v) = \log\left(1 + \left(c^e(u, v) - a_i^e(u, v)/c^e(u, v)\right)\right),$$

where $c^e(u, v)$ denotes a full load capacity of the data link e to be analyzed, and $a_i^e(u, v)$ denotes a preset data type of a forwarded data packet i corresponding to the data link e to be analyzed.

The node features $f^v(u)$ is obtained according to a following formula:

$$f^v(u) = \sum_{v \in \{v | a_i^e(u,v)=1\}} a^e(u, v) / \sum_{v \in \{v | (u,v) \in E\}} a^v(u),$$

where $a^v(u)$ denotes a preset data type of the forwarded data packet corresponding to the node.

Further, the global view is characterized by utilizing the adjacency matrix to obtain a global feature matrix, the node features in the global feature matrix include a forwarded data packet length, a received packet rate and a received bit rate, the features of the data links to be analyzed include a connection status of the data links to be analyzed, a delay of the data links to be analyzed, a transmission bit rate and a transmission packet rate.

Further, in Step B, a feature extraction is performed on the global view, and based on a breadth first algorithm, node features of each neighboring node corresponding to the node are obtained for the each node in the global feature matrix, and a node feature index sequence of the node is established, node features of the node and the node features of the each neighborhood node are output in sequence according to the node feature index sequence, and the feature extraction of the global view is completed.

Further, each data link to be analyzed that directly connects a starting point and an ending point or indirectly connects the starting point and the ending point is exemplified by utilizing an exhaustive method, to obtain the preset data types of the data packets to be forwarded, a feature conversion is performed on the each preset data type, respectively, and classification feature matrices corresponding to the data packets to be forwarded are extracted and obtained, and all the exemplified data links to be analyzed are taken as forwarding paths to select an optimal forwarding path.

Further, in Step E, the optimal forwarding path is updated to improve an accuracy, in a case where the routing selection model is obtained, a load balance optimization is performed on the optimal forwarding path selected by the routing selection model, by scheduling a link allocation of an elephant flow and a mouse flow, and the optimal forwarded path is updated according to optimization results.

Another aspect of the present disclosure provides a routing decision system based on traffic prediction, and the system includes as follows.

A node collection module is configured to obtain each data link to be analyzed between a starting point and an ending point of a direct connection or an indirect connection for forwarding data packets to be forwarded in a target network area, and each node respectively included in each data link to be analyzed.

A forwarded data type extraction module is configured to collect and obtain preset data types respectively corresponding to each forwarded data packet on the data link to be analyzed within one historical time period in a direction from a current time instant to a historical time instant direction.

A module of extracting data types to be forwarded is configured to collect and obtain the preset data types corresponding to the data packets to be forwarded on the data link to be analyzed.

A global view acquisition module is configured to obtain global views corresponding to the each forwarded data packets respectively in view of the each forwarded data packets, the forwarded data packets include packets to be forwarded and forwarded packets.

A feature extraction module is configured to extract features from the global views and obtain link classification features corresponding to the global views.

A classification prediction module is configured to perform a feature conversion on the each preset data type and link classification features corresponding to the data packets to be forwarded and obtain the classification feature matrix.

A module training module is configured to train a routing selection model to be trained for the data link to be analyzed, select and obtain an optimal forwarded path.

A data forwarding module is configured to apply the routing selection module, determine the optimal forwarded path of the data packets to be forwarded, and forward the data packets to be forwarded.

The routing decision-making method and system based on traffic prediction provided in the present disclosure adopts the above technical solutions, and have the following technical effects in comparison with the prior art.

The original model of embedding machine learning into algorithms is improved and a form of a machine learning orchestrator is adopted to implement a plug-and-play machine learning system, the machine learning orchestrator is first trained under the offline status, in a case where the original network is not changed greatly, the desired algorithm is merely required to be selected, the machine learning function is directly added in the machine learning orchestrator for traffic prediction and classification, and the results are taken as the input of the original network which should be used as a posteriori. This method can greatly reduce the delay of network scheduling, routing, and load balancing, and greatly reduce the cost of using predictive time series such as ARIMA, implement the plug-and-play of machine learning into the original network, and achieve optimization on a plurality of application scenarios with minimal changes and low cost.

BRIEF DESCRIPTION OF THE DRAWINGS

FIG. 4 illustrates a work flow chart of a network optimization system according to an exemplary embodiment of the present disclosure.

DETAILED DESCRIPTION OF THE EMBODIMENTS

In order to better understand the technical contents of the present disclosure, specific embodiments are given and illustrated below along with the accompanying drawings.

Aspects of the present disclosure are described in the present disclosure with reference to the accompanying drawings, in which a plurality of illustrative embodiments are illustrated. Embodiments of the present disclosure are not necessarily defined to include all aspects of the present disclosure. It is to be understood that the various concepts and embodiments described above, as well as the concepts and embodiments described in more detail below, may be implemented in an arbitrary one of many ways, since the disclosed concepts and embodiments are not not limited to an arbitrary implementation. Additionally, some aspects of the present disclosure may be used alone or in an arbitrary appropriate combination with other aspects of the present disclosure.

Figure 1:
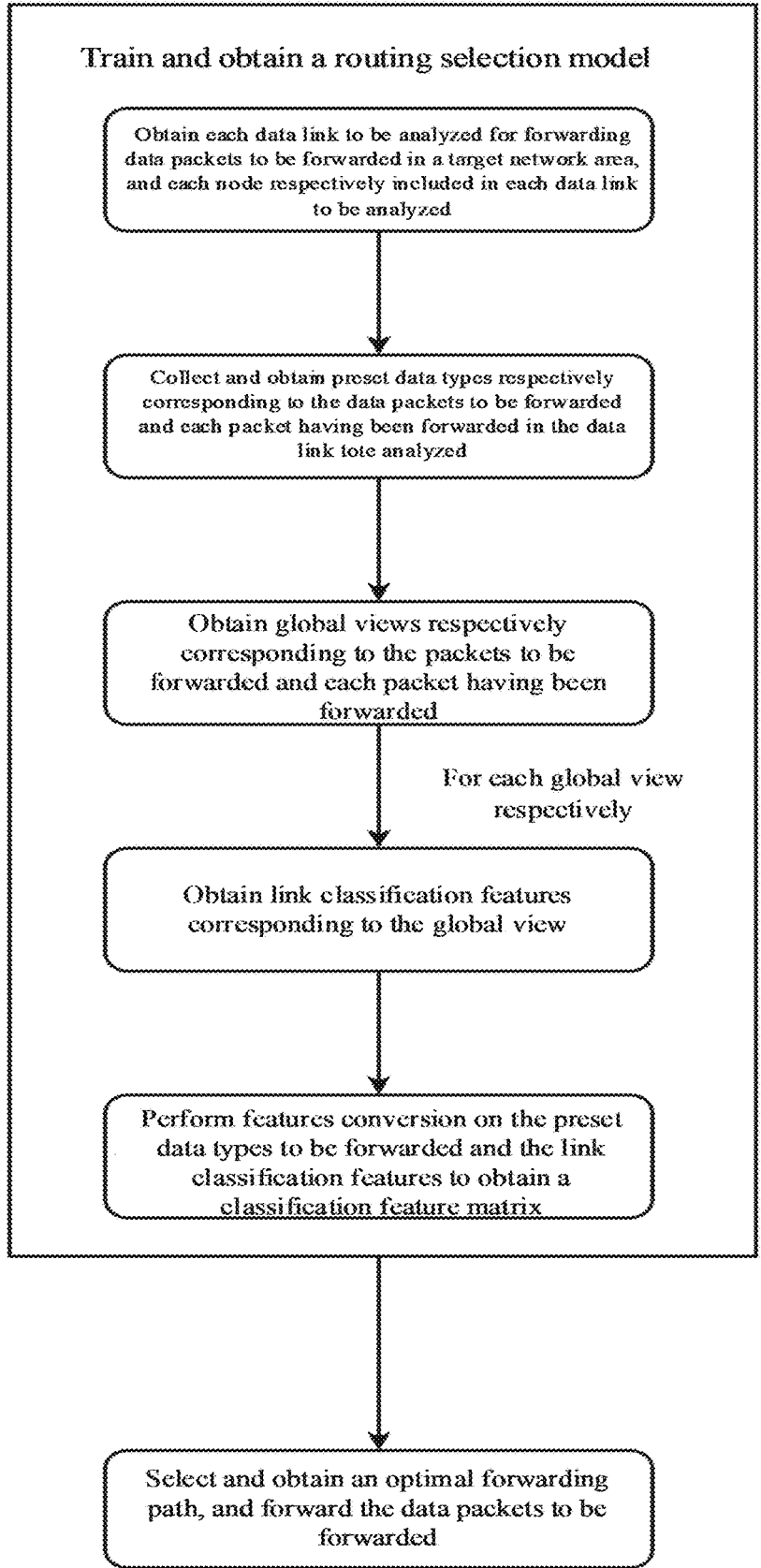
FIG. 1 illustrates a work flow chart of a network optimization method according to an exemplary embodiment of the present disclosure.

With reference to FIGS. 1 to 6, exemplary embodiments of the present disclosure provide a routing decision method based on traffic prediction. The method is used for obtaining each data link to be analyzed between a starting point and an ending point of a direct connection or an indirect connection for forwarding data packets to be forwarded in a target network area, and each node respectively included in each data link to be analyzed; in a case where the target network area receives the data packets to be forwarded, based on positions of the data packets to be forward in the target network area, in view of the each data link to be analyzed for the direct connection or the indirect connection between the starting point and the ending point in the target network area, respectively. As illustrated in FIG. 1, the routing selection model corresponding to the data packets to be forwarded on the each data link to be analyzed are trained and obtained through following Step A to Step D, then by applying the routing selection model, an optimal forwarding path corresponding to the data packets is obtained through following Step E, and the data packets to be forwarded are forwarded according to the optimal forwarding path.

In Step A, preset data types respectively corresponding to each of forwarded data packets on the data link to be analyzed within one historical time period in a direction from a current time instant to a historical time instant direction are collected and obtained. In view of the each forwarded data packet, the each data link to be analyzed that the forwarded data packets pass through in the target network area, as well as each node included in the each data link to be analyzed are obtained. A global view G corresponding to the forwarded data packets respectively is characterized through an adjacency matrix, according to a following formula, $G(V, E, \{f^{v}(u)\}, \{f^{e}(u, v)\})$;

where V denotes a set of the nodes contained in the data link to be analyzed, E denotes a set of the data links to be analyzed corresponding to the forwarded data packets, u and v denote vertices of the global view respectively, that is, nodes of the data link to be analyzed, e denotes the data link to be analyzed, $f^{v}(u)$ denotes node features, $f^{e}(u, v)$ denotes features of the data link e to be analyzed.

A global feature matrix is obtained, where the node features in the global feature matrix include a forwarded data packet length, a received packet rate and a received bit rate, the features of the data links to be analyzed include a connection status of the data links to be analyzed, a delay of the data links to be analyzed, a transmission bit rate and a transmission packet rate. Then, a global view corresponding to the forwarded data packets is obtained, that is, global views corresponding to the each forwarded data packet are obtained respectively, and then Step B is entered.

Node features $f^{e}(u, v)$ of the data link e to be analyzed are obtained according to a following formula:

$$f^{e}(u, v) = \log\left(1 + \left(c^{e}(u, v) - a_{i}^{e}(u, v)/c^{e}(u, v)\right)\right),$$

where $c^{e}(u, v)$ denotes a full load capacity of the data link e to be analyzed, and $a_{i}^{e}(u, v)$ denotes a preset data type of a forwarded data packet i corresponding to the data link e to be analyzed.

The node features $f^{v}(u)$ is obtained according to a following formula:

$$f^{v}(u) = \sum_{v \in \{v | a_{i}^{e}(u,v)=1\}} a^{e}(u, v) / \sum_{v \in \{v | (u,v) \in E\}} a^{v}(u),$$

where $a^{v}(u)$ denotes a preset data type of the forwarded data packet corresponding to node.

In Step B, in view of the each of the global views, a feature extraction module that is configured to extract features from the global views and further obtain link classification features corresponding to the global views is constructed, and then Step C is entered.

As a preferred solution, a feature extraction is performed on the global view, and based on a breadth first algorithm, node features of each neighboring node corresponding to the node are obtained for the each node in the global feature matrix, and a node feature index sequence of the node is established, node features of the node and the node features of the each neighborhood node are output in sequence according to the node feature index sequence, and the feature extraction of the global view is completed.

In Step C, preset data types corresponding to the data packets to be forwarded on the data links to be analyzed are collected and obtained, further global views corresponding to the data packets to be forwarded are obtained, and link classification features corresponding to the data packets to be forwarded are obtained by utilizing the feature extraction module, that is, global views corresponding to the data packets to be forwarded and the forwarded data packets are obtained, respectively.

Further, a classification prediction module that is configured to perform a feature conversion on the data packets to be forwarded and obtain a classification feature matrix for the each global view is constructed based on the each of the preset data types corresponding to the data packets to be forwarded as well as the each link classification feature corresponding to the data packets to be forwarded, and then Step D is entered.

As a preferred solution, each data link to be analyzed that directly connects a starting point and an ending point or indirectly connects the starting point and the ending point is exemplified by utilizing an exhaustive method, to obtain the preset data types of the data packets to be forwarded, a feature conversion is performed on the each preset data type, respectively, and classification feature matrices corresponding to the data packets to be forwarded are extracted and obtained, and all the exemplified data links to be analyzed are taken as forwarding paths to select an optimal forwarding path. The link classification features corresponding to the data packets to be forwarded also come from the global views herein. The global views come from the each data link to be analyzed where the data packets to be forwarded passes through. The each data link to be analyzed is taken as the forwarding paths of the data packets to be forwarded, and the each type of the forwarding paths between the starting point and the ending point can be exemplified. In a case where a path to be forwarded is obtained, a global view corresponding to this forwarding path is obtained at the same time. The different preset data types corresponding to the data packets to be forwarded are unique, that is, the link classification features corresponding to all obtained multiple forwarding paths are also unique. On the contrary, forwarding paths can also be obtained according to the link classification features.

In Step D, a routing selection model to be trained is trained for the data link to be analyzed on a basis of the classification feature matrix obtained by the classification prediction module, by taking forwarded data types corresponding to the each forwarded data packet on the data link to be analyzed as an input, by taking a complete forwarding path in the global view as an output, by taking link classification features corresponding to the forwarded data packets on the data link to be analyzed as training samples, to obtain a routing selection model that is configured to select the optimal forwarding path; and then Step E is entered.

In Step E, the routing selection module is applied, for the data packets to be forwarded, on a basis of the link classification features corresponding to the data packets to be forwarded on the each data link to be analyzed, by taking the each preset data type corresponding to the data packets to be forwarded as an input, to determine the optimal forwarding path of the data packets to be forwarded, and the forwarding of the data packets to be forwarded is completed.

Figure 2:
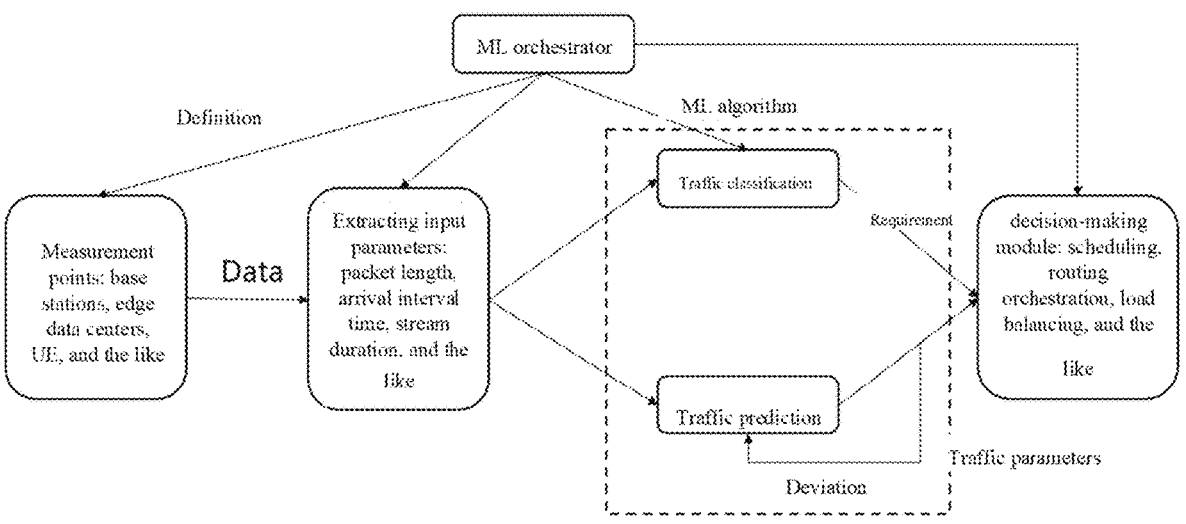
FIG. 2 illustrates a system architecture diagram of a network optimization method according to an exemplary embodiment of the present disclosure.
Figure 3:
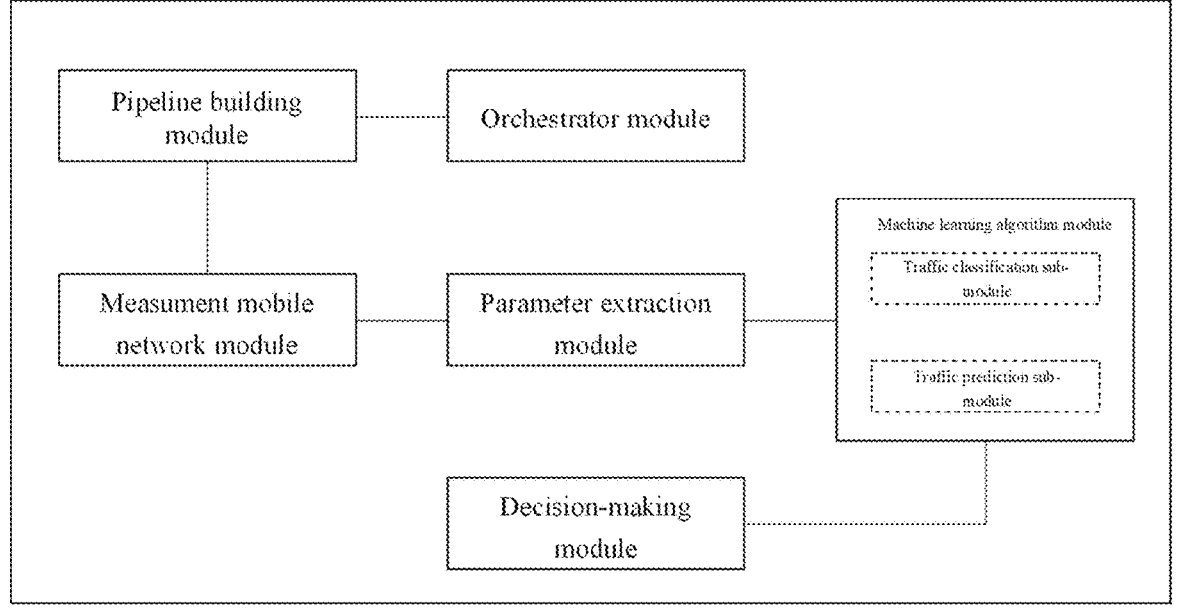
FIG. 3 illustrates a schematic diagram of a network optimization system module according to an exemplary embodiment of the present disclosure.

Another aspect of the present disclosure provides a routing decision system based on traffic prediction, and the system includes a node collection module, a forwarded data type extraction module, a module of extracting data types to be forwarded, a global view acquisition module, a feature extraction module, a classification prediction module, a module training module, and a data forwarding module, with reference to FIGS. 2 to 3, the exemplary embodiments of the present disclosure also include an orchestrator module, a measurement mobile network module, a parameter extraction module, a machine learning algorithm module, a decision-making module, and a pipeline building module.

The orchestrator module is specifically as an instantiated node collection module, defines the collection of measuring mobile network nodes, the duration and aggregation level of traffic measurements, and machine learning pipeline-specific parameters, such as the number of epochs, the number of layers. The orchestrator module is connected to the measurement mobile network module, the parameter extraction module, the machine learning algorithm module and the decision-making module respectively through the instantiated pipelines.

The Measurement mobile network module utilizes standard interfaces to extract the sequence of packets for each flow from the network, along with the length, inter-arrival time, direction (uplink/downlink) and possibly even one part of the payload, and this type of data are taken as the input of the machine learning, and the measurement mobile network module is connected to the parameter extraction module to provide a large amount of basic data for the parameter extraction module.

The parameter extraction module specifically includes a forwarded data type extraction module and a module of extracting data type to be forwarded, selects the data generated by the measurement mobile network module, and provides the selected data as well as the forwarding data type obtained by the forwarded data type extraction module and the module of extracting data type to be forwarded to the corresponding machine learning algorithm module, the parameter extraction module is connected to the machine learning algorithm module to provide the required feature vectors to the machine learning module.

The machine learning algorithm module has the machine learning algorithms that process the data generated by the measurement mobile network module. The machine learning algorithm module is connected to the decision-making module, the machine learning algorithm module trains and predicts the input data, and provides flow information in the next time period to the decision-making module, so that the decision-making module can predict the flow information in advance and make the optimal scheduling. The machine learning algorithm module includes a feature extraction sub-module configured to provide more accurate flow classification information for the decision-making module, and a classification prediction sub-module configured to predict upcoming flows through the machine learning algorithm and convey the predicted information to the decision-making module for better routing and scheduling.

Based on the existing algorithms, the decision-making module merely requires to update these algorithms to take the predictions made by machine learning algorithms as an input. The decision-making module is connected to the machine learning module, configured to makes optimal scheduling, routing, load balancing, and the like based on the classification and prediction of the machine learning algorithm module.

The pipeline building module is configured to instantiate multiple machine learning pipelines for different goals.

Figure 5:
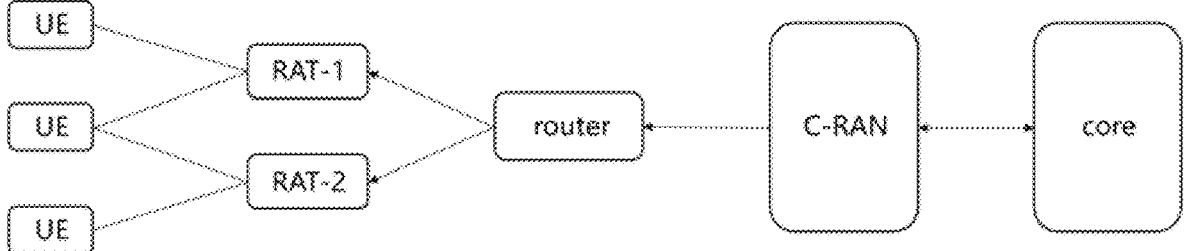
FIG. 5 illustrates an architectural diagram of an embodiment of an exemplary embodiment of the present disclosure.
Figure 6:
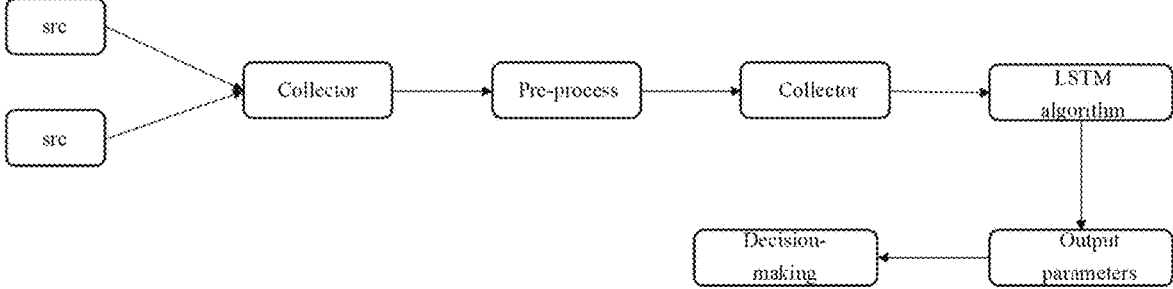
FIG. 6 illustrates a flowchart of an embodiment of the exemplary embodiment of the present disclosure.

With reference to FIGS. 4 to 6, the objectives of the present disclosure is to change the above design of embedding the machine learning into the specific algorithms. The present disclosure uses a machine learning orchestrator to implement a plug-and-play machine learning system that applies the data generated by the machine learning to the decision-making module to achieve effects of reducing data packet delay.

As an embodiment, the objectives of the present disclosure are implemented through the following implementation steps.

In Step 1, the machine learning orchestrator defines the set of collector nodes, the duration and aggregation level of the traffic measurements, and machine learning pipeline-specific parameters such as epochs, number of tiers, and a possible custom loss function.

In Step 2, the machine learning orchestrator instantiates the pipeline of the machine learning orchestrator and collector nodes accordingly according to the set of collector nodes defined in Step 1, instantiates the channels corresponding to the parameter extraction module, machine learning module and network decision-making module, is used to upload data to facilitate the unified scheduling by the machine learning orchestrator and ensure to pre-allocate sufficient computing power to train machine learning models in a centralized or distributed manner.

In Step 3, the observation module collects data and extracts the packet sequence of each flow, as well as the length, arrival time, direction (uplink/downlink), and even parts of the payload, and the like.

In Step 4, the machine learning orchestrator receives the data collected from the observation module, forms a plurality of the feature matrices, and transfers the collected data into the online machine learning model in the form of a traffic matrix for the offline training.

Herein, a graph-aware convolutional structure model is executed, which can be divided into two stages, that is, the feature extraction and the graph-aware convolutional neural network.

The network is composed of a four-tuple, that is, G(V, E, {f$^v$(u)}, {f$^e$(u, v)}), and as the four-tuple corresponding to the embodiment, V denotes a set of the vertices of the topological graph, E denotes a set of links, f$^v$(u)、f$^e$(u, v) denote vertex features and edge features, respectively, the specific sub-steps are as follows.

In Sub-step 1, a global view is formed by the orchestrator after all pipeline and equipment nodes are defined, where u is defined as the vertex, a$^v$(u) is defined as the attribute of the vertex; the edge is defined as (u, v), where u and v denote adjacent vertices, and a$^e$(u, v) is defined as the edge attribute, c$^e$(u, v) is defined as the full load capacity of the edge, and the original attributes used can be the attributes such as the link connection status, the link delay, the accepted bit rate, the accepted packet rate, the transmission bit rate and transmission packet rate, the adjacency matrix are used to express the link connection status, and the edge feature $$f_i^e(u, v)$$

is defined as follows:

$$f_i^e(u, v) = \log\left(1 + \left(c^e(u, v) - a_i^e(u, v)/c_i^e(u, v)\right)\right).$$

In Sub-step 2, vertex attributes are defined according to the link measurements:

$$a^v(u) = \sum_{v \in \{v | a_1^e(u,v)=1\}} a^e(u, v).$$

Vertex features are obtained through the vertex attributes:

$$f^v(u) = (a^v(u, v))/\sum_{v \in \{v | (u,v) \in E\}} a^v(u),$$

where E denotes the set of links.

In Sub-step 3, k neighborhoods are explored for the w root nodes respectively, in a case where the neighborhoods are explored, the global view G is first explored by prioritizing a breadth first approach, and a tree is constructed for the root node u, the root node of the global view can be explored to obtained a plurality of partitions according to the depth D$_{uv}$.

Specifically, centrality is adopted as the criterion for marking the vertices, and the centrality is defined as the number of shortest paths from all vertices to all other vertices through a certain given vertex, which reflects the importance of the vertex. According to the centrality order, partition arrangement is performed to obtain the sequence v$^L$, where L denotes the label of the vertex.

In Sub-step 4, w vertices are selected as the root vertices, k vertices are selected for each vertex in the partition by the index order of the vertices according to the sequence v$^L$, based on this, a link feature matrix $$\left[w, k, k, N_f^e\right]$$

and a vertex feature matrix $$\left[w, k, N_f^v\right]$$

are constructed, where $$N_f^e \text{ and } N_f^v$$

denote the number of input features. According to the historical data (linear regression), traffic load prediction is performed on each link load, path selection is performed on the current node, and the optimal route is selected to reduce the terminal-to-terminal delay.

In Sub-step 5, these matrices are input into convolution kernels with sizes of k2 and k for training, respectively.

In Step 5, after the training is completed, the real-time data are input into the the the trained machine learning model by the machine learning module through the offline trained machine learning model, specifically for traffic prediction and traffic classification.

In Step 6, based on the existing machine learning prediction data size or traffic classification, the decision-making module merely requires to update the predictions of the machine learning algorithm which are taken as the input to provide more accurate predictions and classifications for the original network, rationally schedule the link allocation of the elephant flows and mice, thus achieving the load balance, and the effects of reducing data transmission delay.

Although the present disclosure are disclosed above in terms of preferred embodiments, these are not intended to limit the present disclosure. Those with ordinary skill in the technical field to which the present disclosure belongs can make various modifications and modifications without departing from the spirit and scope of the present disclosure. Therefore, the protection scope of the present disclosure shall be determined by the claims.

What is claimed is:

1. A routing decision method based on traffic prediction, used for obtaining each data link to be analyzed between a starting point and an ending point of a direct connection or an indirect connection for forwarding data packets to be forwarded in a target network area, and each node respectively included in each data link to be analyzed; wherein in a case where the target network area receives the data packets to be forwarded, based on positions of the data packets to be forward in the target network area, in view of the each data link to be analyzed for the direct connection or the indirect connection between the starting point and the ending point in the target network area, respectively, a routing selection model corresponding to the data packets to be forwarded on the each data link to be analyzed are trained and obtained through following Step A to Step D, then by applying the routing selection model, an optimal forwarding path corresponding to the data packets is obtained through following Step E, and the data packets to be forwarded are forwarded according to the optimal forwarding path;

Step A, collecting and obtaining preset data types respectively corresponding to each forwarded data packet on the data link to be analyzed within one historical time period in a direction from a current time instant to a historical time instant, obtaining, in view of the each forwarded data packet, the each data link to be analyzed that the forwarded data packets pass through in the target network area, as well as each node included in the each data link to be analyzed, thereby obtaining a global view corresponding to the forwarded data packets, that is, obtaining global views corresponding to the each forwarded data packet, respectively, and then entering Step B;

Step B, constructing, in view of the each global view, a feature extraction module that is configured to extract features from the global views and further obtain link classification features corresponding to the global views, and then entering step C;

Step C, collecting and obtaining preset data types corresponding to the data packets to be forwarded on the data links to be analyzed, further obtaining global views corresponding to the data packets to be forwarded, and obtaining, by utilizing the feature extraction module, link classification features corresponding to the data packets to be forwarded, that is, obtaining global views corresponding to the data packets to be forwarded and the forwarded data packets, respectively;

further constructing, based on the each preset data type corresponding to the data packets to be forwarded as well as the each link classification feature corresponding to the data packets to be forwarded, a classification prediction module that is configured to perform a feature conversion on the data packets to be forwarded and obtain a classification feature matrix for the each global view, and then entering Step D;

Step D, training, on a basis of the classification feature matrix obtained by the classification prediction module, a routing selection model to be trained for the data link to be analyzed, by taking forwarded data types corresponding to the each forwarded data packet on the data link to be analyzed as an input, by taking a complete forwarding path in the global view as an output, by taking link classification features corresponding to the forwarded data packets on the data link to be analyzed as training samples, to obtain a routing selection model that is configured to select the optimal forwarding path; and then entering Step E; and Step E, applying, on a basis of the link classification features corresponding to the data packets to be forwarded on the each data link to be analyzed, the routing selection module for the data packets to be forwarded, by taking the each preset data type corresponding to the data packets to be forwarded as an input, to determine the optimal forwarding path of the data packets to be forwarded, and completing the forwarding of the data packets to be forwarded.

2. The routing decision method based on the traffic prediction according to claim 1, wherein in Step A, in view of the each forwarded data packet, the each global view corresponding to the forwarded data packets is obtained respectively, wherein the global view includes the each data link to be analyzed that forwards the forwarded data packets and the each node contained in the each data link to be analyzed;

a global view G corresponding to the forwarded data packets respectively is characterized through an adjacency matrix according to a following formula, $$G(V, E, \{f^v(u)\}, \{f^e(u, v)\});$$

where V denotes a set of the nodes contained in the data link to be analyzed, E denotes a set of the data links to be analyzed corresponding to the forwarded data packets, u and v denote vertices of the global view respectively, that is, nodes of the data link to be analyzed, e denotes the data link to be analyzed, $f^v(u)$ denotes node features, $f^e(u, v)$ denotes features of the data link e to be analyzed;

node features $f^e(u, v)$ of the data link e to be analyzed are obtained according to a following formula:

$$f^e(u, v) = \log\left(1 + \left(c^e(u, v) - a_i^e(u, v)/c^e(u, v)\right)\right),$$

where $c^e(u, v)$ denotes a full load capacity of the data link e to be analyzed, and $a_i^e(u, v)$ denotes a preset data type of a forwarded data packet i corresponding to the data link e to be analyzed; and the node features $f^v(u)$ is obtained according to a following formula:

$$f^v(u) = \sum_{v \in \{v | a_i^e(u,v)=1\}} a^e(u, v) / \sum_{v \in \{v | (u,v) \in E\}} a^v(u),$$

where $a^v(u)$ denotes a preset data type of the forwarded data packet corresponding to the node.

3. The routing decision method based on the traffic prediction according to claim 2, wherein the global view is characterized by utilizing the adjacency matrix to obtain a global feature matrix, the node features in the global feature matrix include a forwarded data packet length, a received packet rate and a received bit rate, the features of the data links to be analyzed include a connection status of the data links to be analyzed, a delay of the data links to be analyzed, a transmission bit rate and a transmission packet rate.

4. The routing decision method based on the traffic prediction according to claim 3, wherein in Step B, a feature extraction is performed on the global view, based on a breadth first algorithm, node features of each neighboring node corresponding to the node are obtained for the each node in the global feature matrix, and a node feature index sequence of the node is established, node features of the node and the node features of the each neighborhood node are output in sequence according to the node feature index sequence, and the feature extraction of the global view is completed.

5. The routing decision method based on the traffic prediction according to claim 1, wherein each data link to be analyzed that directly connects a starting point and an ending point or indirectly connects the starting point and the ending point is exemplified by utilizing an exhaustive method, to obtain the preset data types of the data packets to be forwarded, a feature conversion is performed on the each preset data type, respectively, and classification feature matrices corresponding to the data packets to be forwarded are extracted and obtained, and all the exemplified data links to be analyzed are taken as forwarding paths to select an optimal forwarding path.

6. The routing decision method based on the traffic prediction according to claim 1, wherein in Step E, the optimal forwarding path is updated to improve an accuracy, in a case where the routing selection model is obtained, a load balance optimization is performed on the optimal forwarding path selected by the routing selection model, by scheduling a link allocation of an elephant flow and a mouse flow, and the optimal forwarded path is updated according to optimization results.

\* \* \* \* \*